(4)

Jan. 9, 1968 V. J. FOWLER ETAL 3,363,103

OPTICAL TIME MULTIPLEXING SYSTEM

Filed July 19, 1965 2 Sheets-Sheet 1

INVENTORS.
VERNON J. FOWLER
STEPHEN H. MAYBAR
BY R. J. Frank
ATTORNEY.

OPTICAL TIME MULTIPLEXING SYSTEM

Filed July 19, 1965 2 Sheets-Sheet 2

INVENTORS.
VERNON J. FOWLER
STEPHEN H. MAYBAR
BY R. J. Frank
ATTORNEY.

3,363,103

OPTICAL TIME MULTIPLEXING SYSTEM

Vernon J. Fowler, East Meadow, and Stephen H. Maybar, Brooklyn, N.Y., assignors to General Telephone and Electronics Laboratories, Inc., a corporation of Delaware Filed July 19, 1965, Ser. No. 473,068
7 Claims. (Cl. 250—199)

ABSTRACT OF THE DISCLOSURE

An optical time multiplexing system is described in which the transmitter contains a number of light modulators each of which corresponds to an information channel and a number of non-modulating elements disposed therebetween. When the modulator and elements are sequentially scanned by deflecting a laser beam, the resultant beam contains a scan signal multiplexed thereon. The receiver contains a photodetector for each information channel, a scanner for deflecting the received beam to sequentially scan the photodetectors, and a scan signal detector for recovering the scan signal and driving the scanner in synchronism with the deflection of the laser beam at the transmitter.

This invention relates to an optical time multiplexing system wherein a number of communication channels are time multiplexed on a light beam.

The recent development of the continuous wave laser has generated interest in the possibility of using a beam of light as an information carrier. As a consequence of the relatively high frequency ($10^5$ gc./sec.), the quasi monochromaticity, and the collimation properties of the generated light, the laser is potentially an excellent source of electromagnetic waves for transmitting information at multigigacycle rates. The major limitations in making efficient use of the potential of laser communications are the high frequency requirements placed on the electrical components of the system. The inability to provide efficient continuous wave modulation and sensitive detection of laser beams at microwave frequencies has been found to present serious difficulties for systems based on the frequency multiplexing of wide band signals. As employed in the art, frequency multiplexing denotes a method of information transmission in which each information channel modulates a separate subcarrier with the subcarriers being spaced in frequency. Thus two or more channels may be simultaneously transmitted on a common carrier, in this case a light beam, by dividing the carrier into a number of frequency bands.

An alternative approach to wide band optical communication is based on the principles of time multiplex transmission wherein typically each information channel modulates a carrier with pulses which are spaced in time so that no two pulses occupy the same time interval. Therefore, time division multiplexing permits the transmission of two or more signals over a common path by using different time intervals for the transmission of the information in each channel. By taking this approach, the laser beam can be modulated with extremely wide information bandwidths, of the order of gigacycles, without the need for electrical components individually capable of responding to gigacycle variations. As a result of the reduced requirements on the bandwidth capabilities of the modulators and detectors, optimum performance can be more readily achieved with these components.

Time multiplexing systems are governed by Shannon's Sampling Theorem, which states that any band-limited signal can be completely reproduced if it is sampled at a rate of at least two times the highest frequency component of the signal. The original signals are recovered by passing these samples through a low-pass filter having a cutoff frequency just above the highest frequency component of the original band-limited signal. The output of this filter is then a replica of the original signal.

By sampling a number of information channels in sequence to create a series of pulses, each of which has an amplitude that is a function of the instantaneous signal that appeared in the channel at the moment of sampling, the channels are multiplexed in time for transmission. At the receiver, the transmitted series of pulses are separated and the pulses corresponding to one information channel are supplied to a corresponding low pass filter to regenerate the original band-limited signal.

In a carrier-type transmission system, the series of pulses are relayed from transmitter to receiver by an electromagnetic carrier. The minimum carrier frequency $F_{min}$ required for an N information channel time multiplex system is $$F_{\text{min.}}=4\sum_{i=1}^{N} F_i$$

wherein $F_i$ is the highest possible frequency present in the $i$th channel. Additional discussion of the above relation may be found in chapter 4 of the book entitled, "Information Transmission Modulation and Noise," by M. Schwartz, published by McGraw-Hill,, 1959.

As a result of the high frequency of laser radiation, a large number of information channels having bandwidths of many megacycles may be utilized. These video bandwidth channels can be provided in time multiplexing systems without the need for complicated microwave and electronic frequency multiplexing circuitry. Also, due to the directional properties of a collimated monochromatic light beam, the output beam of a laser can be efficiently utilized with a high signal-to-noise ratio.

However the inherent nature of time multiplexing systems, wherein samples of a number of information channels are transmitted in a definite time relation, requires that the sampling means at the transmitter be driven in exact synchronism with the scanning means at the receiver. The scanning means serves to sort out the received samples and connect each to the proper low pass filter which in turn regenerates the original band-limited signal. Failing to drive the sampling and scanning means in synchronism results in an undesired mixing of the information channels.

Accordingly, an object of the present invention is the provision of an optical time multiplexing system wherein the receiver and transmitter are maintained in synchronism by a signal multiplexed on the light beam carrier.

Another object is to provide an optical time multiplexing system wherein the sampling means generates the synchronizing signal for the receiver.

A further object is the provision of an optical multiplexing system wherein a large number of video bandwidth information channels are time multiplexed on a light beam carrier.

Still another object is the provision of an optical multiplexing system wherein a light beam carrier can be modulated at up to gigacycle rates without the need for electrical components capable of responding to gigacycle variations.

In accordance with the present invention, an optical time multiplexing system is provided comprising generally a transmitter adapted to sample a number of information channels at a predetermined scanning frequency and time multiplex the samples on a light beam carrier, and a receiver adapted to demultiplex the received light and regenerate the sampled information in each of the channels.

The transmitter includes a plurality of light modulators with each modulator corresponding to an individual information channel. A light source emitting a collimated monochromatic light beam is spaced from the modulator array. Between the array and the light source, a scanner is positioned for deflecting the light beam and periodically scanning the modulators in the array. The scanner is driven at a predetermined frequency, generally at least two times the highest frequency component of the modulating signals. The scanning of the modulators results in a periodic sampling of the information in each channel with the samples appearing as a series of light pulses of varying intensity spaced in time. Thus, the individual information channels are time multiplexed on a light beam carrier.

In addition, a number of non-modulating elements are positioned in the array between adjacent light modulators. These elements are also sampled by the scanner with the result that full intensity samples are multiplexed between adjacent information channel samples for transmission. The pattern obtained from scanning these elements is a signal having a component at the scanning frequency.

This component is a synchronizing signal and can be used at the receiver to insure the demultiplexing of the pulsed light beam carrier and the regeneration of the signals in the individual information channels. The strength of this component is determined primarily by the number of non-modulating elements employed which in effect controls the number of full intensity pulses provided. In practice, a number of non-modulating elements equal to one-half the number of modulators is preferred.

The sequential sampling of the array results in the transmission of a pattern of time multiplexed light pulses with the shape of the transmitted light pattern corresponding to the shape of the array. A circular array is desirable since this provides continuous scanning without the delays inherent in sweep scanning. After the sampling operation, the transmitted light pattern can be sent over a distance limited only by thermal gradients, scattering and diffraction effects. As a result of these effects, the pattern may no longer be recognizable as a cylinder of light at the receiving end. The signals, however, are still preserved in time multiplex.

At the receiver, a receiving telescope collects the incoming light to form a thin beam which is then scanned at the same frequency employed by the scanner at the transmitter. Also, a plurality of photodetectors equal to the number of modulating sources and positioned in a similar array are provided at the receiver. A scanner is interposed between the receiving telescope and the array of photodetectors for deflecting the received light pattern so that it strikes the photodetectors.

However, to insure that an individual photodetector receives only the samples from a single information channel, the two scanning means must be driven in synchronism. To this end, a scan-signal photodetector is provided at the receiver for detecting the component at the scanning frequency of the signal generated by the non-modulating sources at the transmitter. This component is then utilized to drive the receiver scanner in synchronism with the transmitter scanner.

Although the photodetectors are required to detect the intensity of the individual light pulses striking them, they need not preserve the duration or narrow width thereof. By selecting the photodetector bandwidth to be substantially equal to the bandwidth of the information channels at the transmitter, the pulses are integrated by the photodetectors to regenerate the waveforms of the corresponding information channel.

Further features and advantages of the invention will become more readily apparent from the following detailed description of a specific embodiment, in which:

FIGS. 1*a* and 1*b* show the respective block schematic diagrams of a transmitter and a receiver of one embodiment of the invention;

Figure 1A:
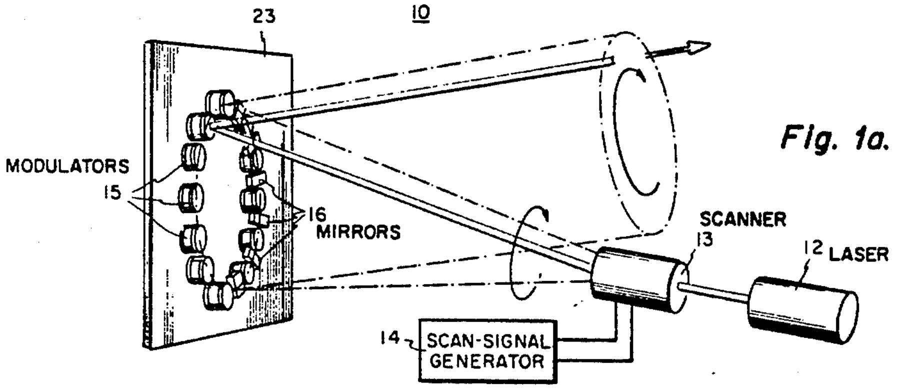
Figure 1B:
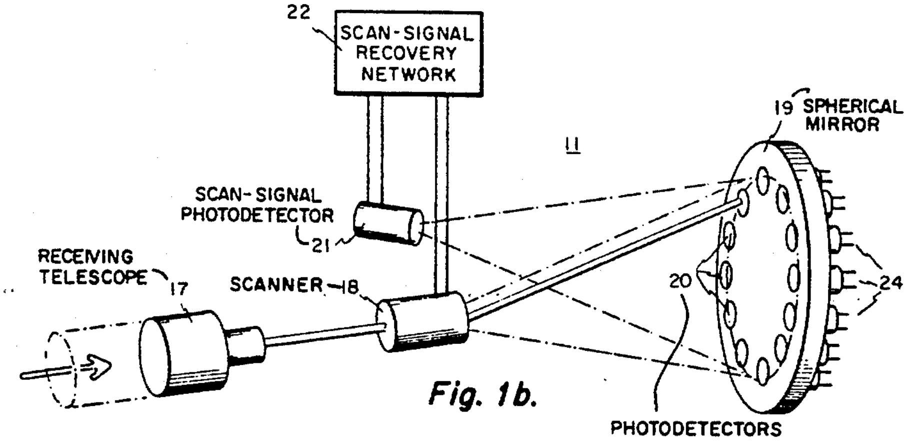
Figure 4A:
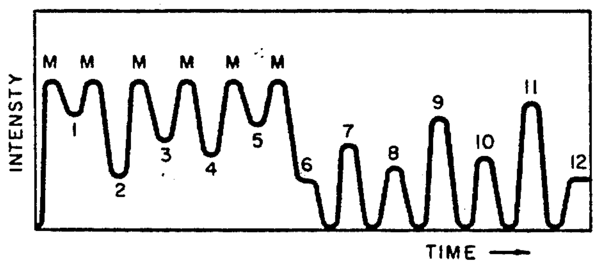
Figure 4B:
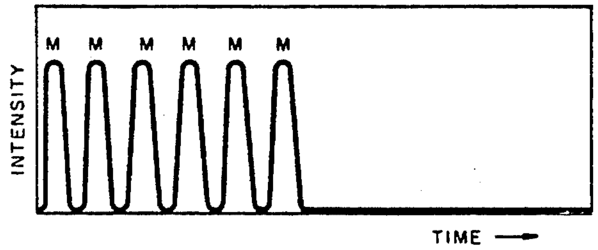
Figure 5:
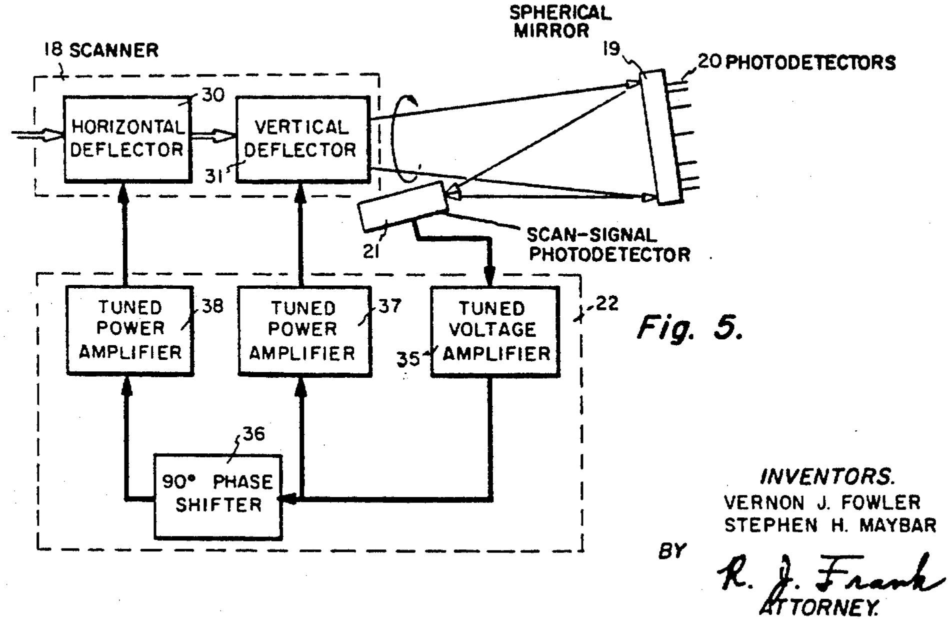

FIGS. 4*a* and 4*b* show representative transmitted light beam intensities for the embodiment of FIGS. 1*a* and 1*b*; and FIG. 5 is a block schematic diagram of the scan-signal synchronizing circuit of FIG. 1*b*.

Referring to FIGS. 1*a* and 1*b*, there is shown an optical time multiplexing system comprising generally a transmitter 10 for time multiplexing a number of information channels on a light beam and a receiver 11 for demultiplexing the light beam and regenerating the individual information channel signals.

The transmitter 10 shown in FIG. 1*a* includes a scanner 13 disposed in the path of the output light beam of laser 12. The energization of the scanner by scan-signal generator 14 causes the light beam to be deflected in passing through the scanner. As shown, scanner 13 provides two-dimensional deflection to generate a conical deflection characteristic.

Figure 3:
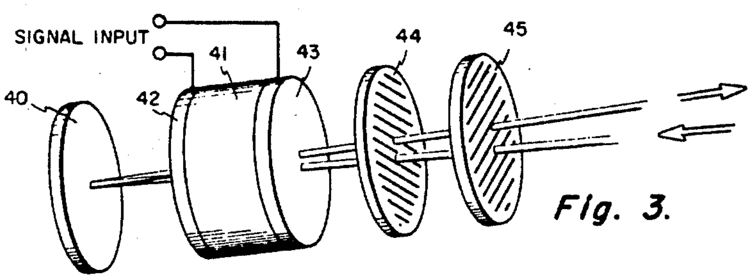
FIG. 3 is a detailed view of one of the modulators of the transmitter of FIG. 1*a*.

In addition, a number of light modulators 15 are mounted on backing plate 23 in an equi-spaced circular array. The backing plate, which may be formed of either light absorbent or light transmitting material depending on the type of modulator employed, is positioned near the output of scanner 13. Each light modulator 15 corresponds to an individual information channel and the signal in one of the channels is continuously applied thereto. One type of modulator for use with a light absorbent backing plate is shown in FIG. 3 in which a signal is applied across an electro-optic medium to vary the birefringence thereof accordingly. The intensity of a light beam passing within each of the modulators is then varied in accordance with the applied signal.

By positioning the center of the circular array of modulators on the axis of the scanner, the deflection provided causes the light beam to sequentially scan each of the modulators. During the time the beam scans a particular modulator, the instantaneous intensity of the transmitted pulse is determined by the signal in the corresponding information channel. In the embodiment shown, the modulators 15 are reflecting so that after entering the modulators in the forward direction, the light beam is reflected within the modulator and emitted from the entering surface. This doubles the effective modulator length and also permits control of the direction of the reflected beam through the adjustment of the individual modulators. As shown, the pattern of the reflected beams forms a cylinder of the same radius as the modulator array.

Also, other types of modulators may be employed if desired. And for embodiments using non-reflecting modulators, the backing plate 23 should be formed of light transparent material to permit the modulated light to be passed therethrough. However, the use of non-reflecting modulators does not permit the direction of the modulated beam to be varied by the adjustment of the modulator, the thickness and refractive index of the backing plate should be selected so that the light passed by the modulators should be essentially parallel.

In the embodiment of FIG. 1, the light pattern reflected from the array of modulators is time multiplexed with its intensity at a given point in space appearing as a series of pulses whose amplitudes are determined by the information channel signals applied to the individual modulators. By selecting the frequency of the scan-signal applied to scanner 13 to be at least two times the highest frequency component of the information channel signals, these signals can be recovered by passing the received pulses through a low-pass filter having a cutoff frequency just above the highest frequency component.

In addition to the spaced modulators, a number of interstitial mirrors 16 are mounted on backing plate 23. As shown, these mirrors are mounted in the spaces between adjacent modulators and are disposed in the path of the conical scanned beam of light. In contrast with the modulators which are normally biased at their half intensity points to permit the modulated intensity to vary symmetrically from full to zero intensity, these non-modulating elements provide full intensity output pulses. These output pulses are time multiplexed between adjacent information channel pulses and are used at the receiver to generate a synchronous scan signal to drive the scanning means at the receiver. It will be noted that in other embodiments employing non-reflecting modulators, the non-modulating elements may be considered as those spaces between modulators having no interstitial mirrors therein.

After being modulated and shaped into a cylindrical pattern, the still-collimated reflected light is transmitted over a distance to the receiver whereupon it is collected by a receiving telescope 17. The receiving telescope, of which many types such as Newtonian are suitable, reduces the cylindrical pattern to form a thin beam which is then conically scanned by a second scanner 18 similar to scanner 13.

Spaced from scanner 18 is a spherical mirror 19 having a number of output signal photodetectors 20, mounted therein. The number of photodetectors 20 is equal to the number of modulators 15 so that each photodetector corresponds to a single information channel and when the scanner 18 is driven in synchronism with scanner 13, the light beam is deflected so that each photodetector will receive only the light pulses from a single channel.

The photodetectors 20 need not resolve the shape of each pulse and therefore their bandwidths are made about equal to the modulator bandwidth to minimize the introduction of noise. The received pulses are integrated by the detectors to regenerate the waveforms of the original signals and are supplied to further utilization circuits by leads 24.

Further, a scan-signal photodetector 21 is spaced from the spherical mirror 19. The axis of symmetry of the mirror is rotated to be at a small angle, for example 5 degrees, with the axis of the scanned beam. Thus, all light intercepted by the mirror can be focused on the surface of the scan-signal photodetector. The output of the scan-signal photodetector is supplied to scan signal recovery network 22 which in turn is coupled to and drives scanner 18.

Initially, no signal is present to drive the scanner 18 and consequently the beam passes through undeflected. The undeflected beam strikes the mirror and is reflected into the scan-signal photodetector which integrates the pulses supplied to it and delivers a signal at the scan frequency. This signal is amplified and filtered by the feedback network and then supplied to scanner 18. This causes the beam to spiral outward while the reflected beam remains focused on the scan-signal photodetector. When the diameter of the circle of light on the mirror 19 equals the diameter of the circle of photodetectors, only the light pulses provided by the non-modulating elements are received by the scan-signal photodetector. The light pulses provided by the individual light modulators at the transmitter are received by the individual output signal photodetectors with the mirror surfaces between photodetectors reflecting the other pulses.

The light pulses received by the scan-signal photodetector have a strong component at the scan frequency of scanner 13 which does not vary from cycle to cycle in amplitude and phase. Therefore, supplying this signal to scanner 18 insures synchronism with the deflector at the transmitter.

Figure 2:
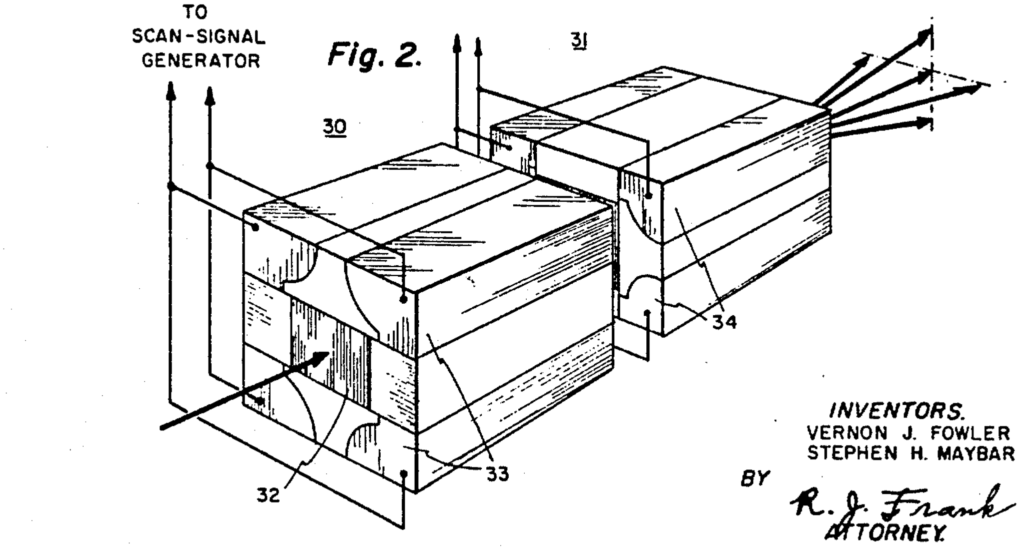
FIG. 2 shows in detail the scanner employed in the embodiment of FIGS. 1*a* and 1*b*.

One form of scanner found particularly well suited for use in the above-described embodiment is shown in FIG. 2 and described in an article entitled "Electro-optic Light Beam Deflector" appearing in vol. 52, No. 2 of the Proceedings of the IEEE at page 193 and in the copending U.S. patent application Ser. No. 313,041, filed October 1, 1963 by C. Buhrer and V. Fowler. The scanner provides a conical scan by employing two electro-optic beam deflectors 30, 31 disposed along the path of the light and oriented at right angles with respect to each other. An electro-optic beam deflector utilizes an electro-optic crystal 32, 33, such as $KH_2PO_4$ wherein the application of an electric field thereto results in a variation of the crytsal index of refraction to provide one-dimensional deflection. Therefore, employing two deflectors oriented at 90 degrees with respect to each other permits two-dimensional deflection and applying drive signals having a relative phase shift of 90 degrees to metal electrodes 33 and 34, establishes a conical scanning pattern.

The construction of a modulator especially adapted for use in the transmitter modulator array of FIG. 1 is shown in FIG. 3. The modulator comprises a mirror 40 mounted on one face of an electro-optic crystal 41 formed of a material such as $KH_2PO_4$ and having transparent electrodes 42 and 43 formed of $SnO_2$ or the like. A one-eighth wave retardation plate 44 is mounted on the opposing surface of the electro-optic crystal with a plane polarizer 45 affixed thereto.

The operation of this modulator is based upon the birefringence introduced into an electro-optic crystal when it is subjected to an electric field .The electric field is provided by coupling an information channel to electrodes 42 and 43 so that the information channel signal is applied thereacross. When the polarized laser beam passes through the electro-optic crystal, it strikes mirror 40 and is reflected back through the crystal. In this manner, the birefringent effect of the electro-optic crystal is doubled.

The one-eighth wave plate 44 in front of electro-optic crystal 42 is used for optical biasing. In passing twice through this plate, the light experiences a quarter-wave retardation which, in turn, results in a zero signal light intensity which is half that of the entering light. The electrically induced birefringence of the crystal varies the retardation of the modulator output with the result that the plane polarized light output thereof can vary symmetrically from full intensity to zero intensity. It will be noted in FIG. 1, that the interstitial mirrors mounted between the modulators provide essentially full intensity light pulses.

A representative pattern of transmitted light intensity for the transmitter 10 of FIG. 1 is shown in FIG. 4*a*. The time duration of the pattern corresponds to one complete sampling cycle for an array of twelve modulators with the signal samples being designated by the corresponding numerals. The full-intensity pulses provided by the non-modulating elements, which in this embodiment are interstitial mirrors, are marked M.

The pattern of FIG. 4*b* shows what is obtained if only the light that strikes the non-modulating elements is collected at the receiver. It is apparent that this signal contains a strong component at the scanning frequency which can be employed to drive the receiver deflector 18 and obtain demultiplexing of the information channel signals. The strength of this component depends on the number of non-modulating elements mounted in the modulator array and different numbers of elements may be used if desired.

The non-modulating elements so employed must be placed within the modulator array to provide light pulses capable of generating a component at the scan-signal frequency. To optimize the strength of this component, the elements should be placed in consecutive spaces between adjacent modulators with the number equal to one-half the number of modulators. However, it will be noted that fewer numbers of elements may be employed provided that they are not equally spaced around the modulator array. This latter condition results only in the generation of harmonics of the scan-signal frequency and not of the fundamental.

The detailed operation of the receiver will be readily understood from the block schematic diagram of the receiver shown in FIG. 5 wherein the output of the receiving telescope (not shown) is supplied to scanner 18. Scanner 18 comprises a horizontal deflector 30 and a vertical deflector 31. These deflectors are driven by the output of the scan-signal recovery network 22 to which is connected scan-signal photodetector 21.

When the system commences operation and the time multiplexed light pattern is intially received, no signal is being reflected by spherical mirror 19 and therefore no signal is supplied by scan-signal photodetector 21 to network 22 for driving deflectors 30 and 31. Thus, the thin beam first passes through the beam deflector without experiencing any deflection. This undeflected beam strikes mirror 19 and is reflected into the scan-signal photodetector 21 which integrates the pulses and delivers a signal at the scan frequency to the feedback network. This signal is then amplified by tuned voltage amplifier 35 and tuned power amplifiers 37 and 38 and supplied to the deflectors which causes the beam to spiral outward. It will be noted that phase shifter 36 is coupled to deflector 30 to provide a 90 degree phase shift between the signals supplied to the two deflectors.

The deflection of the beam grows in amplitude with a speed determined by the bandwidth of the tuned amplifiers. The maximum amplitude of the scanning voltage is regulated by saturation of power amplifiers 37, 38 or by conventional automatic gain control techniques such that the final diameter of the circle of light on the mirror causes the beam to sequentially strike the photodetectors mounted therein. When this diameter is reached, the only pulses received by the scan-signal detector are those provided by the non-modulating elements at the transmitter and therefore the modulators and photodetectors are scanned in synchronism.

While the above description has referred to a specific embodiment of the invention, it is apparent that many modifications and variations may be made therein without departing from the spirit and scope of the invention.

What is claimed is:

1. An optical time multiplexing system comprising in combination:
  - (a) a transmitter for time multiplexing a plurality of information channel signals on a light beam and transmitting same which comprises
    - (1) means for providing a collimated monochromatic light beam;
    - (2) a plurality of light modulators mounted in a spaced array, each of said modulators having an individual information channel signal applied thereto;
    - (3) at least one non-modulating element mounted in said spaced array;
    - (4) first scanning means disposed in the path of said light beam for deflecting said beam and scanning said light modulators and said non-modulating element at a predetermined scan frequency whereby said information channel signals are time multiplexed on said light beam, and
  - (b) a receiver for demultiplexing the transmitted light beam and regenerating the individual information channel signals which comprises
    - (1) a plurality of photodetectors mounted in a spaced array each of which corresponds to an individual information channel;
    - (2) a scan-signal photodetector mounted in said spaced array for receiving the time multiplexed signal from said non-modulating element, said signal having a component at said scan frequency, and
    - (3) second scanning means for deflecting said light beam so as to scan said array of photodetectors, said scanning means being connected to the output of said scan-signal photodetector whereby said second scanning means is driven in synchronism with said first scanning means to demultiplex said light beam.

2. An optical time multiplexing system comprising in combination:
  - (a) a transmitter for time multiplexing a plurality of information channel signals on a light beam and transmitting same which comprises
    - (1) means for providing a collimated monochromatic light beam;
    - (2) a plurality of light modulators mounted in an equi-spaced circular array, each of said modulators having an individual information channel signal applied thereto;
    - (3) a number of non-modulating elements mounted in the spaces between adjacent modulators in said circular array, said non-modulating elements being unequally spaced around said array; and
    - (4) first scanning means disposed in the path of said light beam for deflecting said beam and scanning said light modulators and said non-modulating elements at a frequency of at least two times the highest frequency component of the information channel signals to be transmitted, whereby said information channel signals are time multiplexed on said light beam, and
  - (b) a receiver for demultiplexing said light beam and regenerating the individual information channel signals which comprises
    - (1) a spherical mirror;
    - (2) a plurality of photodetectors mounted on said mirror in an equi-spaced circular array each of which corresponds to an individual information channel, said photodetectors having a bandwidth substantially equal to the bandwidth of the corresponding information channel;
    - (3) a scan-signal photodetector spaced from and positioned along the axis of said spherical mirror for receiving light reflected thereon, said scan-signal photodetector being responsive to a component at said scan frequency of the time multiplexed signal from said unmodulated light sources; and
    - (4) second scanning means for deflecting said light beam so as to scan said array of photodetectors, said scanning means being connected to the output of said scan-signal photodetector whereby said second scanning means is driven in synchronism with said first scanning means to demultiplex said light beam.

3. Apparatus in accordance with claim 2 in which the number of non-modulating elements is equal to one-half the number of modulators with said non-modulating elements being mounted in consecutive spaces between adjacent modulators.

4. Apparatus in accordance with claim 2 in which each of said non-modulating elements comprises a mirror.

5. An optical time multiplexing system comprising in combination:
  - (a) a transmitter for time multiplexing a plurality of information channel signals on a light beam and transmitting same which comprises
    - (1) means for providing a collimated monochromatic light beam;
    - (2) a plurality of electro-optic light modulators mounted in an equi-spaced circular array, each of said modulators having an individual information channel signal applied thereto;
    - (3) at least one non-modulating element mounted in a space between adjacent modulators in said circular array, said at least one non-modulating element being unequally spaced around said array; and
    - (4) first scanning means disposed in the path of said light beam for deflecting said beam and scanning said light modulators and said at least one non-modulating element at a frequency of at least two times the highest frequency component of the information channel signals to be transmitted whereby said information channel signals are time multiplexed on said light beam, the output light pattern of said transmitter having a cylindrical shape with a cross-section substantially equal to said circular array, and (b) a receiver for demultiplexing and regenerating the individual information channel signals which comprises (1) a receiving telescope for reducing the transmitted light pattern to form a thin beam;

(2) a spherical mirror spaced from said receiving telescope and positioned such that its axis of symmetry is rotated with respect to said thin beam;

(3) a plurality of photodetectors mounted on said mirror in an equi-spaced circular array each of which corresponds to an individual information channel, said photodetectors having a bandwidth substantially equal to the bandwidth of the corresponding information channel;

(4) second scanning means positioned between said receiving telescope and said mirror for deflecting said thin beam and scanning said photodetectors; and (5) a scan-signal photodetector spaced from and positioned along the axis of said spherical mirror for receiving the reflected light therefrom, said scan-signal photodetector being responsive to a component at said scan frequency of the time multiplexed signal from said non-modulating element, the output of said scan-signal photodetector being supplied to said second scanning means so that said second scanning means is driven in synchronism with said first scanning means.

6. An optical time multiplexing system comprising in combination:

(a) a transmitter for time multiplexing a plurality of information channel signals on a light beam and transmitting same which comprises (1) means for providing a collimated monochromatic light beam;

(2) a plurality of electro-optic light modulators mounted in an equi-spaced circular array, each of said modulators having an individual information channel signal applied thereto;

(3) at least one non-modulating element mounted in a space between adjacent modulators in said circular array, said at least one non-modulating element being unequally spaced around said array; and (4) first scanning means disposed in the path of said thin beam for deflecting said beam to conically scan said light modulators and said at least one non-modulating element at a frequency of at least two times the highest frequency component of the information channel signals to be transmitted whereby said information channel signals are time multiplexed on said light beam, the output light pattern of said transmitter having a cylindrical shape with a cross-section substantially equal to said circular array, and (b) a receiver for demultiplexing and regenerating the individual information channel signals which comprises (1) a receiving telescope for reducing the transmitted light pattern to form a thin beam;

(2) a spherical mirror spaced from said receiving telescope and positioned such that its axis of symmetry is rotated with respect to said thin beam;

(3) a plurality of photodetectors mounted on said mirror in an equi-spaced circular array each of which corresponds to an individual information channel, said photodetectors having a bandwidth substantially equal to the bandwidth of the corresponding information channel;

(4) second scanning means positioned between said receiving telescope and said mirror for deflecting said thin beam to conically scan said photodetectors;

(5) a scan-signal photodetector spaced from and positioned along the axis of said spherical mirror for receiving the reflected light therefrom, said scan-signal photodetector being responsive to a component at said scan frequency of the time multiplexed signal from said non-modulating element; and (6) a scan signal recovery network connected to the output of said scan-signal photodetector and to said second scanning means, said network regulating the maximum amplitude of the signal at the scan frequency so that said second scanning means is driven in synchronism with said first scanning means with the deflected beam striking said photodetectors.

7. An optical time multiplexing system comprising in combination:

(a) a transmitter for time multiplexing a plurality of information channel signals on a light beam and transmitting same which comprises (1) means for providing a collimated monochromatic light beam;

(2) a plurality of electro-optic light modulators mounted in an equi-spaced circular array, each of said modulators having an individual information channel signal applied thereto, said modulators each having a mirror on the surface remote from said light source;

(3) at least one interstitial mirror mounted in a space between adjacent modulators in said circular array, said at least one interstitial mirror being unequally spaced around said array; and (4) first scanning means disposed in the path of said light beam for deflecting said beam and scanning said light modulators and said at least one interstitial mirror at a frequency of at least two times the highest frequency component of the information channel signals to be transmitted whereby said information channel signals are time multiplexed on said light beam, the reflected output light pattern of said transmitter having a cylindrical shape with a cross-section substantially equal to said circular array, and (b) a receiver for demultiplexing and regenerating the individual information channel signals which comprises (1) a receiving telescope for reducing the transmitted light pattern to form a thin beam;

(2) a spherical mirror spaced from said receiving telescope and positioned such that its axis of symmetry is rotated with respect to said thin beam;

(3) a plurality of photodetectors mounted on said mirror in an equi-spaced circular array each of which corresponds to an individual information channel, said photodetectors having a bandwidth substantially equal to the bandwidth of the corresponding information channel;

(4) second scanning means positioned between said receiving telescope and said mirror for deflecting said thin beam and scanning said photodetectors; and (5) [illegible]

(5) a scan-signal photodetector spaced from and positioned along the axis of said spherical mirror for receiving the reflected light therefrom, said scan-signal photodetector being responsive to a component at said scan frequency of the time multiplexed signal from said interstitial mirror, the output of said scan-signal photodetector being supplied to said second scanning means so that said second scanning means is driven in synchronism with said first scanning means.

References Cited

UNITED STATES PATENTS

| | | | |
|---|---|---|---|
| 3,218,390 | 11/1965 | Bramley | 250—199 X |
| 3,256,443 | 6/1966 | Moore | 250—199 |
| 3,264,611 | 8/1966 | Lohmann | 250—199 X |
| 3,275,746 | 9/1966 | Beltrami | 178—6.8 |

JOHN W. CALDWELL, *Primary Examiner.*

A. MAYER, *Assistant Examiner.*